United States Patent
Gao et al.

(10) Patent No.: US 11,582,141 B2
(45) Date of Patent: Feb. 14, 2023

(54) TRAFFIC FORWARDING METHOD AND TRAFFIC FORWARDING APPARATUS

(71) Applicant: Huawei Technologies Co., Ltd., Shenzhen (CN)

(72) Inventors: Yuan Gao, Nanjing (CN); Wenhui Li, Nanjing (CN); Kai Li, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 85 days.

(21) Appl. No.: 16/852,660

(22) Filed: Apr. 20, 2020

(65) Prior Publication Data

US 2020/0244569 A1 Jul. 30, 2020

Related U.S. Application Data

(63) Continuation of application No. PCT/CN2018/087950, filed on May 23, 2018.

(30) Foreign Application Priority Data

Oct. 20, 2017 (CN) .......................... 201710982471.0

(51) Int. Cl.
*H04L 45/00* (2022.01)
*H04L 45/24* (2022.01)
(Continued)

(52) U.S. Cl.
CPC ............ *H04L 45/22* (2013.01); *H04L 45/245* (2013.01); *H04L 45/28* (2013.01); *H04L 61/103* (2013.01)

(58) Field of Classification Search
CPC ....... H04L 45/22; H04L 45/245; H04L 45/28; H04L 61/103; H04L 61/6009;
(Continued)

(56) References Cited

U.S. PATENT DOCUMENTS 8,948,181 B2 2/2015 Kapadia et al.
9,100,329 B1 * 8/2015 Jiang .................. H04L 41/0663
(Continued)

FOREIGN PATENT DOCUMENTS

CN 101599907 A 12/2009
CN 102148677 A 8/2011
(Continued)

*Primary Examiner* — Nishant Divecha
(74) *Attorney, Agent, or Firm* — Conley Rose, P.C.

(57) ABSTRACT

A traffic forwarding method includes determining, by a first network device, a first address resolution protocol (ARP) entry of the access device, where the first ARP entry is used to indicate a mapping relationship among a media access control (MAC) address, an Internet Protocol (IP) address, and an egress port, the egress port includes a standby egress port, and the first network device is connected to the protection link through the standby egress port, receiving traffic sent by a network side, determining whether a fault exists in the first multi-chassis link aggregation group (MC-LAG) link, and when the first network device determines that a fault exists in the first MC-LAG link, sending the traffic to the second network device through the protection link based on a standby egress port number in the first ARP entry, where the standby egress port number is used to indicate the standby egress port.

19 Claims, 4 Drawing Sheets

(51) Int. Cl.
*H04L 45/28* (2022.01)
*H04L 61/103* (2022.01)

(58) Field of Classification Search
CPC ............... H04L 61/6022; H04L 45/745; H04L 61/2007; H04L 61/255; Y02D 30/50
See application file for complete search history.

(56) References Cited

U.S. PATENT DOCUMENTS

| | | | |
|---|---|---|---|
| 2005/0180429 A1* | 8/2005 | Ghahremani | H04L 47/24 370/395.21 |
| 2010/0189117 A1* | 7/2010 | Gowda | H04L 45/28 370/401 |
| 2012/0033668 A1* | 2/2012 | Humphries | H04L 45/245 370/390 |
| 2012/0033678 A1* | 2/2012 | Page | H04L 49/552 370/401 |
| 2015/0288559 A1* | 10/2015 | Yasuda | H04L 41/0654 370/217 |
| 2016/0044145 A1 | 2/2016 | Zhou | |

FOREIGN PATENT DOCUMENTS

| | | |
|---|---|---|
| CN | 102291320 A | 12/2011 |
| CN | 102413052 A | 4/2012 |
| CN | 102664788 A | 9/2012 |
| CN | 104836739 A | 8/2015 |
| CN | 105704257 A | 6/2016 |
| JP | 5588857 B2 | 9/2014 |
| WO | 2014086041 A1 | 6/2014 |

\* cited by examiner

TRAFFIC FORWARDING METHOD AND TRAFFIC FORWARDING APPARATUS

CROSS-REFERENCE TO RELATED APPLICATIONS

This application is a continuation of International Patent Application No. PCT/CN2018/087950, filed on May 23, 2018, which claims priority to Chinese Patent Application No. 201710982471.0, filed on Oct. 20, 2017. The disclosures of the aforementioned applications are hereby incorporated by reference in their entireties.

TECHNICAL FIELD

This application relates to the communications field, and in particular, to a traffic forwarding method and a traffic forwarding apparatus in the communications field.

BACKGROUND

A multi-chassis link aggregation group (MC-LAG) is a layer 2 port virtualization technology across network devices. The two devices have independent control planes but support port binding of the two devices, thereby improving link reliability from a board level to a device level and forming a dual-active system. An MC-LAG paired switch provides an MC-LAG interface to the outside for accessing a layer 2 service. A peer-link is disposed between MC-LAG paired switches for exchanging MC-LAG protocol messages and for traffic forwarding of a horizontal service between devices. From a three-layer perspective, MC-LAG paired devices are two independent devices that may support independent network management and serve as independent routing nodes. During specific networking, the MC-LAG technology may be used to implement network logic acyclicization between an aggregation layer switch and an access layer switch, or the MC-LAG technology may be used to implement an application scenario in which dual-active access is required by dual network interface cards in a server. The MC-LAG technology may be combined with technologies such as a general Ethernet technology, a transparent interconnection of lots of links (TRILL) technology, and a virtual extensible local area network (VXLAN) to implement the dual-active access in the server technology.

In a dual-active system, specifically, a device A and a device B are used as an example. To implement dual-active access of a server C, two network interface cards of the server C may be separately connected to the device A and the device B. In addition, the two network interface cards of the server C are bound into one MC-LAG dual-active member interface such that the server C is connected to the device A and the device B through a first MC-LAG link and a second MC-LAG link in a dual-homing manner, and the device A and the device B each have an MC-LAG dual-active member interface as an access interface. A direct link peer-link exists between the two devices A and B in which the MC-LAG is deployed, and the link is used to control exchanges of packets and to implement traffic bypass. Therefore, the device A and the device B each have a peer-link interface. In addition, through the peer-link, address resolution protocol (ARP) packets may be synchronized between the device A and the device B. An ARP packet synchronized to a peer device is redirected to the access interface, to implement ARP packet synchronization between the device A and the device B.

When the device A receives traffic sent by a network side to the server C, because an outbound interface of an ARP entry of the server C points to the access interface of the device A, the device A may directly forward the traffic from the access interface to the server C. However, if a fault occurs in a link between the device A and the server C, the device A deletes the ARP entry of the server C that is previously learned from the access interface, and re-learns an ARP entry of the server C from the peer-link interface. In this case, an outbound interface of the new ARP entry points to the peer-link interface, and the device A may forward the traffic to the device B through a peer-link channel, and then the device B forwards the traffic to the server C.

Therefore, in the traffic forwarding process, the device A needs to delete the existing ARP entry, the learning of the ARP entry is re-triggered after the traffic arrives, and then traffic bypass is caused, resulting in a relatively long convergence time for the traffic forwarding.

SUMMARY

This application provides a traffic forwarding method and a traffic forwarding apparatus, to help reduce a convergence time for traffic forwarding.

According to a first aspect, a traffic forwarding method is provided, applied to a network including a first network device, a second network device, and an access device, where the access device is connected to the first network device and the second network device through a first MC-LAG link and a second MC-LAG link in a dual-homing manner, the first network device and the second network device are connected to each other through a protection link, and the method includes determining, by the first network device, a first ARP entry of the access device, where the first ARP entry is used to indicate a mapping relationship among a media access control (MAC) address, an Internet Protocol (IP) address, and an egress port, the egress port includes a standby egress port, and the first network device is connected to the protection link through the standby egress port, receiving, by the first network device, traffic sent by a network side, determining, by the first network device, whether a fault exists in the first MC-LAG link, and when the first network device determines that a fault exists in the first MC-LAG link, sending, by the first network device, the traffic to the second network device through the protection link based on a standby egress port number in the first ARP entry, where the standby egress port number is used to indicate the standby egress port.

Specifically, the first network device may determine the first ARP entry of the access device, the first ARP entry includes the standby egress port, and the standby egress port points to the protection link, and may be referred to as a peer-link port of the first network device. After receiving the traffic sent by the network side, the first network device may query for the first ARP entry based on an IP address of the traffic, and determine that the traffic needs to be forwarded to the access device. Further, the first network device determines whether a fault exists in the first MC-LAG link, and when a fault exists in the first MC-LAG link, the traffic is forwarded to the second network device through the standby egress port. In other words, the first network device forwards the traffic to the second network device through the standby egress port, and the second network device forwards the traffic to the access device through the access interface of the second network device.

In the traffic forwarding method in this embodiment of this application, the first network device sets the standby egress port for an ARP entry such that a process in which the first network device deletes the ARP entry when a fault exists in an access-side link and re-learns an ARP entry after the traffic arrives is effectively avoided, thereby helping reduce a convergence time for the traffic forwarding, and improving system performance.

With reference to the first aspect, in some implementations of the first aspect, the egress port further includes a main egress port, the first network device is connected to the first MC-LAG link through the main egress port, and the method further includes, when the first network device determines that no fault exists in the first MC-LAG link, sending, by the first network device, the traffic to the access device through the first MC-LAG link based on the main egress port number in the first ARP entry, where the main egress port number is used to indicate the main egress port.

Specifically, the first ARP entry may include two egress ports, namely, the main egress port and the standby egress port. The main egress port points to the first MC-LAG link, and is the access interface of the first network device. The standby egress port points to the protection link, and may be referred to as a peer-link interface of the first network device. When no fault exists in the first MC-LAG link, the first network device may directly forward the traffic to the access device through the main egress port.

With reference to the first aspect, in some implementations of the first aspect, the determining, by the first network device, a first ARP entry of the access device includes obtaining, by the first network device, a second ARP entry of the access device from the main egress port through learning, where the second ARP entry includes the main egress port number, determining, by the first network device, that the main egress port is a dual-active member interface, where the dual-active member interface includes an interface for connecting to the first MC-LAG link and an interface for connecting to the second MC-LAG link, and adding, by the first network device, the standby egress port number to the egress port in the second ARP entry, to obtain the first ARP entry.

It should be understood that the main egress port number is used to indicate the main egress port, and the main egress port is a port of the first network device for connecting to the first MC-LAG link, for example, an access interface. The standby egress port number is used to indicate the standby egress port, and the standby egress port is a port of the first network device for connecting to the protection link, for example, a peer-link interface.

Specifically, the first network device may first learn, from the access interface of the first network device, the ARP entry of the access device, and the ARP entry is referred to as the second ARP entry in this specification. The second ARP entry includes only the main egress port, namely, the access interface. The first network device may determine whether the access interface is a dual-active member interface (namely, an MC-LAG dual-active member interface). When the access interface is a dual-active member interface, the first network device adds the standby egress port (namely, the peer-link port) to the egress port in the ARP entry to generate a new ARP entry, which is referred to as the first ARP entry in this specification. Therefore, in the first ARP entry, egress ports of the traffic include the main egress port and the standby egress port.

With reference to the first aspect, in some implementations of the first aspect, the first ARP entry further includes a main identifier corresponding to the main egress port, the main identifier is used to indicate that the first MC-LAG link connected to the main egress port is an active link, and the main identifier is used by the first network device to detect the first MC-LAG link.

Specifically, the first ARP entry may further include identification information, used to distinguish between the main egress port and the standby egress port. The identification information may include the main identifier corresponding to the main egress port. For example, if the main egress port is an access interface, and an identifier corresponding to the access interface is the main identifier, it indicates that the first MC-LAG link connected to the access interface is an active link.

In this embodiment of this application, the first network device may determine, based on the main identifier corresponding to the access interface, that the access interface is the main egress port, and then determine that the first MC-LAG link connected to the access interface is the active link. Then, the first network device may detect whether a fault exists in the active link. If no fault exists in the active link, the first network device may directly forward the traffic of the network side through the active link based on the main egress port number in the first ARP entry. Alternatively, if a fault exists in the active link, the first network device may forward the traffic of the network side through the standby link based on the standby egress port number in the first ARP entry.

With reference to the first aspect, in some implementations of the first aspect, the first ARP entry includes a standby identifier corresponding to the standby egress port, and the standby identifier is used to indicate that the protection link connected to the standby egress port is a standby link.

Specifically, the identification information may further include the standby identifier corresponding to the standby egress port. For example, if the standby egress port is a peer-link interface, and an identifier corresponding to the peer-link interface is the standby identifier, it indicates that the peer-link connected to the peer-link interface is a standby link.

According to a second aspect, a traffic forwarding apparatus is provided configured to perform the method in any one of the first aspect or the possible implementations of the first aspect. Specifically, the traffic forwarding apparatus includes a unit configured to perform the method in any one of the first aspect or the possible implementations of the first aspect.

According to a third aspect, another traffic forwarding apparatus is provided, where the terminal apparatus includes a transceiver, a memory, and a processor. The transceiver, the memory, and the processor communicate with one another through an internal connection path. The memory is configured to store an instruction. The processor is configured to execute the instruction stored in the memory, to control a receiver to receive a signal and control a transmitter to transmit a signal. When the processor executes the instruction stored in the memory, the execution enables the processor to perform the method in any one of the first aspect or the possible implementations of the first aspect.

According to a fourth aspect, a computer program product is provided, and the computer program product includes computer program code. When the computer program code is run by a computer, the computer is enabled to perform the method in any one of the first aspect or the possible implementations of the first aspect.

According to a fifth aspect, a computer-readable medium is provided configured to store a computer program, where the computer program includes an instruction used to per-

DESCRIPTION OF EMBODIMENTS

The following describes technical solutions of this application with reference to the accompanying drawings.

For ease of understanding, some terms used in this specification are described first.

MC-LAG is a mechanism for implementing multi-chassis link aggregation, and link aggregation between a plurality of devices can be implemented such that link reliability is improved from a board level to a device level and a dual-active system is formed. A basic idea of an MC-LAG technology is to allow two access devices to perform link aggregation negotiation with an accessed device in a same status. From a perspective of the accessed device, this is similar to establishing a link aggregation relationship with a device.

Peer-link is a direct link between two network devices in which the MC-LAG is deployed. A peer-link is a layer 2 link and is used to control exchanges of packets and to implement traffic bypass. Specifically, the devices at both ends of the peer-link may control, through the peer-link, transmission of the packets (for example, an ARP entry). In addition, when a fault exists in an access link of a device connected to the peer-link at one end, the traffic is forwarded through the peer-link such that the traffic bypass is implemented. After an interface is configured as a peer-link interface, no other services can be configured on the interface.

MC-LAG dual-active member interface is a dual-homed interface. Statuses of two MC-LAG dual-active member interfaces need to be synchronized.

Figure 1:
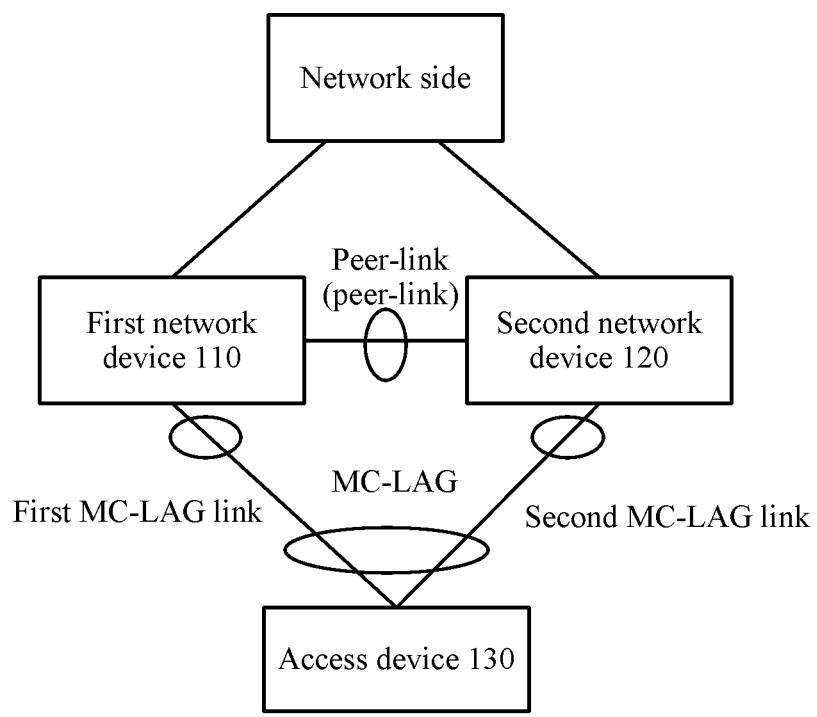
FIG. 1 is a schematic diagram of a network system according to an embodiment of this application.

FIG. 1 is a schematic diagram of a communications system used in an embodiment of this application. Referring to FIG. 1, the communications system 100 includes a network side, a first network device 110, a second network device 120, and an access device 130. The first network device 110 and the second network device 120 are connected to the network side, and can receive traffic sent by the network side. In addition, the access device 130 is connected to the first network device 110 and the second network device 120 based on an MC-LAG through a first MC-LAG link and a second MC-LAG link in a dual-homing manner. Therefore, the first network device 110 and the second network device 120 each have an MC-LAG dual-active member interface as an access-side interface (referred to as an access interface in this specification), and the traffic may be forwarded to the access device 130 through the access interface. The first network device 110 is connected to the first MC-LAG link through the access interface of the first network device 110, and the second network device 120 is connected to the second MC-LAG link through the access interface of the second network device 120. A direct link peer-link exists between the first network device 110 and the second network device 120 in which the MC-LAG is deployed, and the link is used to negotiate exchanges of packets and transmission of partial traffic. Therefore, the first network device 110 and the second network device 120 each have a peer-link interface, and the traffic may be forwarded to a peer network device through the peer-link interface. The first network device 110 is connected to the peer-link through the peer-link interface of the first network device 110, and the second network device 120 is connected to the peer-link through the peer-link interface of the second network device 120. Through the peer-link, ARP packets may be synchronized between the first network device 110 and the second network device 120. An ARP packet synchronized to a peer device is redirected to the access interface, to implement ARP packet synchronization.

It should be understood that the first network device 110 and the second network device 120 may be connected to the network side directly or indirectly. The direct connection means that the first network device and the second network device are directly connected to a network side device through a communication link. The indirect connection means that another network device exists between the links of the first network device 110, the second network device 120, and the network side device. This is not limited in this embodiment of this application.

It should be further understood that the first network device 110 and the second network device 120 include a switch or a router, and the access device 130 includes a switch, a router, a server, or the like. This is not limited in this embodiment of this application.

FIG. 1 is only an example of a simplified schematic diagram for ease of understanding. A network may further include another device, for example, a core network device or a single-homing device, not drawn in FIG. 1. However, this is also not limited in this embodiment of this application.

That the first network device 110 performs traffic forwarding is used as an example below to describe an existing traffic forwarding process in detail.

Specifically, when the first network device 110 receives traffic sent by the network side to the access device 130, because an outbound interface of an ARP entry of the access device 130 points to the access interface, the first network device 110 may directly forward the traffic from the access interface of the first network device 110 to the access device 130 by querying for the ARP entry of the access device 130.

If a fault exists in the link between the first network device 110 and the access device 130, the network side cannot sense the fault, and still sends the traffic to the first network device 110. Once the first network device 110 finds that a fault exists in the access-side link, the first network device 110 deletes the ARP entry of the access device 130 that is previously learned from the access interface. Then, when receiving the traffic sent by the network side, the first network device 110 re-learns an ARP entry of the access device 130 from the peer-link interface. In this case, an outbound interface of the new ARP entry points to the peer-link interface. The first network device 110 may forward the traffic to the second network device 120 through the peer-link, and then the second network device 120 forwards the traffic to the access device 130.

It should be understood that the ARP entry may be used by the first network device 110 to find a corresponding link-layer identifier (namely, a MAC address) based on an IP address, and then the first network device 110 encapsulates the MAC address outside the IP address and sends the traffic to a corresponding egress port. Therefore, after receiving the traffic forwarded by the first network device 110, the second network device 120 only needs to query a layer 2 forwarding table based on the MAC address to find a corresponding access-side interface, and then forwards the traffic.

However, in the foregoing traffic forwarding process, the first network device 110 needs to delete the existing ARP entry. After the traffic arrives, the learning of the ARP entry is re-triggered, and then traffic bypass is caused, resulting in a relatively long convergence time for the traffic forwarding. Therefore, the embodiments of this application provide a new traffic forwarding method.

Figure 2:
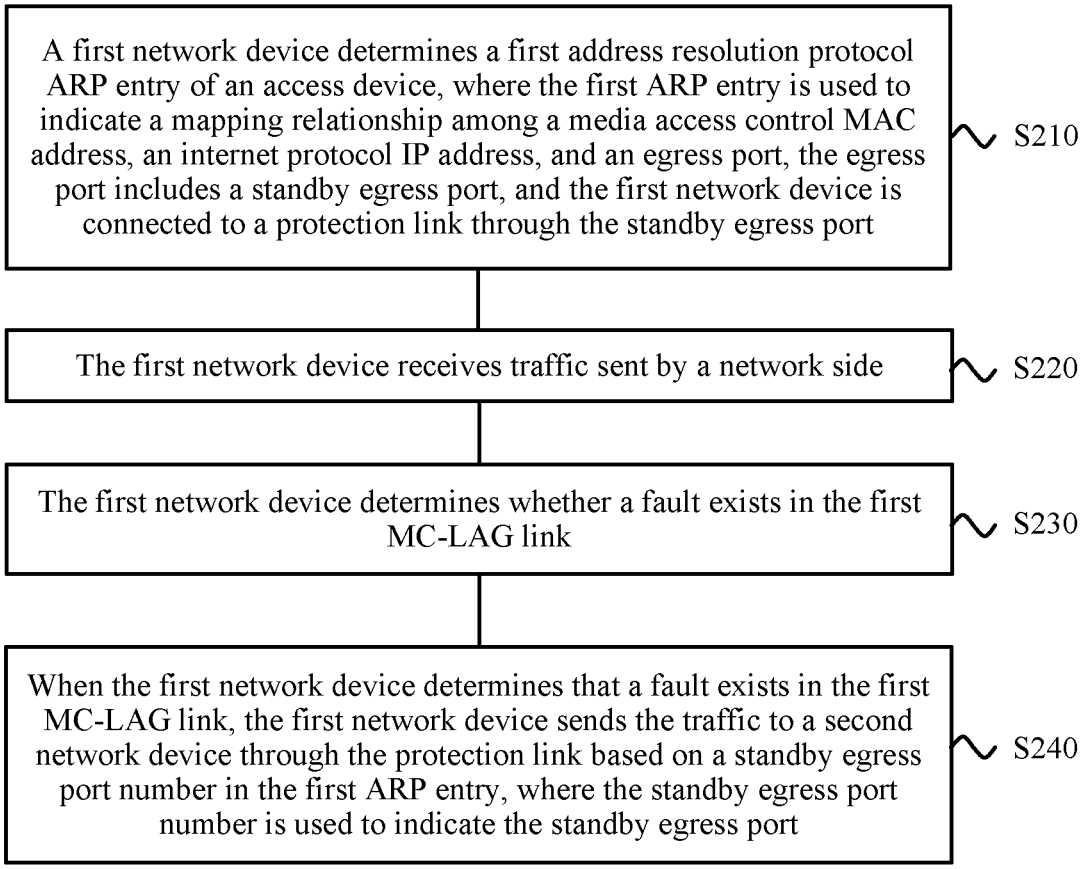
FIG. 2 is a schematic flowchart of a traffic forwarding method according to an embodiment of this application.

FIG. 2 is a schematic flowchart of a traffic forwarding method 200 according to an embodiment of this application. The method 200 may be applied to the communications system 100 shown in FIG. 1, but this embodiment of this application is not limited thereto.

S210. The first network device determines a first ARP entry of the access device, where the first ARP entry is used to indicate a mapping relationship among a MAC address, an IP address, and an egress port, the egress port includes a standby egress port, and the first network device is connected to the protection link through the standby egress port.

It should be understood that the standby egress port is an interface of the first network device. In a specific implementation, for example, referring to FIG. 1, the standby egress port is a peer-link port of the first network device 110, and the protection link may be a peer-link.

S220. The first network device receives traffic sent by a network side.

Optionally, the traffic may carry a destination IP address, used to indicate that the network side needs to send the traffic to an IP address of a destination device.

S230. The first network device determines whether a fault exists in the first MC-LAG link.

S240. When the first network device determines that a fault exists in the first MC-LAG link, the first network device sends the traffic to the second network device through the protection link based on a standby egress port number in the first ARP entry, where the standby egress port number is used to indicate the standby egress port.

Specifically, the first network device may determine the first ARP entry of the access device, the first ARP entry includes the standby egress port, and the standby egress port points to the protection link, and may be referred to as the peer-link port of the first network device. After receiving the traffic sent by the network side, the first network device may query for the first ARP entry based on an IP address of the traffic, and determine that the traffic needs to be forwarded to the access device. Further, the first network device determines whether a fault exists in the first MC-LAG link. When a fault exists in the first MC-LAG link, the traffic is forwarded to the second network device through the standby egress port. In other words, the first network device forwards the traffic to the second network device through the standby egress port, and then the second network device forwards the traffic to the access device through the access interface of the second network device.

In the traffic forwarding method in this embodiment of this application, the first network device sets the standby egress port for an ARP entry such that a process in which the first network device deletes the ARP entry when a fault exists in an access-side link and re-learns an ARP entry after the traffic arrives is effectively avoided, thereby helping reduce a convergence time for the traffic forwarding, and improving system performance.

It should be understood that the fault in a link between the first network device and the access device may be a fault occurring in the access interface of the first network device, or a fault occurring in the access interface of the access device, or a fault occurring in a circuit between the first network device and the access device. This is not limited in this embodiment of this application. However, it should be understood that, in this embodiment of this application, because the first network device needs to forward the traffic to the second network device, the first network device can work properly.

In an optional embodiment, the egress port further includes a main egress port, the first network device is connected to the first MC-LAG link through the main egress port, and the method further includes, when the first network device determines that no fault exists in the first MC-LAG link, sending, by the first network device, the traffic to the access device through the first MC-LAG link based on a main egress port number in the first ARP entry, where the main egress port number is used to indicate the main egress port.

Specifically, the first ARP entry may include two egress ports, namely, the main egress port and the standby egress port. The main egress port points to the first MC-LAG link, and is the access interface of the first network device. The standby egress port points to the protection link, and may be referred to as the peer-link interface of the first network device. When no fault exists in the first MC-LAG link, the first network device may directly forward the traffic to the access device through the main egress port.

It should be understood that, although the traffic is eventually forwarded to the access device directly or indirectly, in this embodiment of this application, regardless of which of the foregoing forwarding paths is used, even if the first network device fails on the access-side link, a process in which the first network device deletes the locally existing ARP entry and re-learns an ARP entry after the traffic arrives is not triggered.

It should be further understood that, in a specific implementation, the first network device may set the main egress port as a default egress port, and after a fault exists in the link between the first network device and the access device, the egress port is directly switched to the standby egress port. This is not limited in this embodiment of this application.

In the foregoing embodiment, the first network device sets the main egress port and the standby egress port for an ARP entry, and when a fault exists in an access-side link, the first network device may directly determine the standby egress port in the ARP entry as an egress port such that a process in which the first network device deletes the ARP entry when a fault exists in the access-side link and re-learns an ARP entry after the traffic arrives is effectively avoided, thereby helping reduce a convergence time for the traffic forwarding, and improving system performance.

In an optional embodiment, that the first network device determines a first ARP entry of the access device includes obtaining, by the first network device, a second ARP entry of the access device from the main egress port through learning, where the second ARP entry includes the main egress port number, determining, by the first network device, that the main egress port is a dual-active member interface, where the dual-active member interface includes an interface for connecting to the first MC-LAG link and an interface for connecting to the second MC-LAG link, and adding, by the first network device, the standby egress port number to the egress port in the second ARP entry, to obtain the first ARP entry.

It should be understood that the main egress port number is used to indicate the main egress port, and the main egress port is a port of the first network device for connecting to the first MC-LAG link, for example, an access interface. The standby egress port number is used to indicate the standby egress port, and the standby egress port is a port of the first network device for connecting to the protection link, for example, a peer-link interface.

Specifically, the first network device may first learn, from the access interface of the first network device, the ARP entry of the access device, and the ARP entry is referred to as the second ARP entry in this specification. The second ARP entry includes only the main egress port, namely, the access interface. The first network device may obtain, through a peer-link, information about a device connected to the second network device, for example, a device identifier. Then the first network device determines, in combination with a device connected to the first network device, whether a same device that is connected to both the first network device and the second network device through an MC-LAG link exists. If such a device exists, it is considered that an access interface connected to the device is a dual-active member interface (namely, an MC-LAG dual-active member interface). When the access interface is the dual-active member interface, the first network device adds the standby egress port (namely, the peer-link port) to the egress port in the ARP entry and generates a new ARP entry, which is referred to as the first ARP entry in this specification. Therefore, in the first ARP entry, egress ports of the traffic include the main egress port and the standby egress port.

It should be understood that, in a possible implementation, the foregoing egress port may be represented in a form of a port number, but this is not limited in this embodiment of this application. In addition, the first network device adds a label to each of the main egress port and the standby egress port, to identify which port is the main egress port and which port is the standby egress port, or distinguishes between the main egress port and the standby egress port in another manner. This is not limited in this embodiment of this application either.

In an optional embodiment, the first ARP entry further includes a main identifier corresponding to the main egress port, where the main identifier is used to indicate that the first MC-LAG link connected to the main egress port is an active link, and the main identifier is used by the first network device to detect the first MC-LAG link.

Specifically, the foregoing first ARP entry may further include identification information, used to distinguish between the main egress port and the standby egress port. The identification information may include the main identifier corresponding to the main egress port. For example, if the main egress port is an access interface, and an identifier corresponding to the access interface is the main identifier, it indicates that the first MC-LAG link connected to the access interface is an active link.

In this embodiment of this application, the first network device may first determine, based on the main identifier corresponding to the access interface, that the access interface is the main egress port, and then determine that the first MC-LAG link connected to the access interface is the active link. Then, the first network device may detect whether a fault exists in the active link. If no fault exists in the active link, the first network device may directly forward the traffic of the network side through the active link based on the main egress port number in the first ARP entry. Alternatively, if a fault exists in the active link, the first network device may forward the traffic of the network side through the standby link based on the standby egress port number in the first ARP entry.

In an optional embodiment, the first ARP entry includes a standby identifier corresponding to the standby egress port, where the standby identifier is used to indicate that the protection link connected to the standby egress port is a standby link.

Specifically, the identification information may further include the standby identifier corresponding to the standby egress port. For example, if the standby egress port is a peer-link interface, and an identifier corresponding to the peer-link interface is the standby identifier, it indicates that the peer-link connected to the peer-link interface is a standby link.

It should be understood that, in a possible implementation, when the egress port includes only the main egress port and the standby egress port, the first network device may set only the main identifier, used to indicate the main egress port, or set only the standby identifier, used to indicate the standby egress port. When forwarding the traffic, the first network device only needs to determine the main egress port based on the main identifier, to determine that the other port is the standby egress port. Alternatively, the first network device may only need to determine the standby egress port based on the standby identifier, to determine that the other port is the main egress port. This is not limited in this embodiment of this application.

In another possible implementation, both the main identifier and the standby identifier exist in the first ARP entry. For example, 1 bit is used to identify the main egress port and the standby egress port separately. 1 represents the main egress port, and 0 represents the standby egress port. However, this is not limited in this embodiment of this application.

Figure 3:
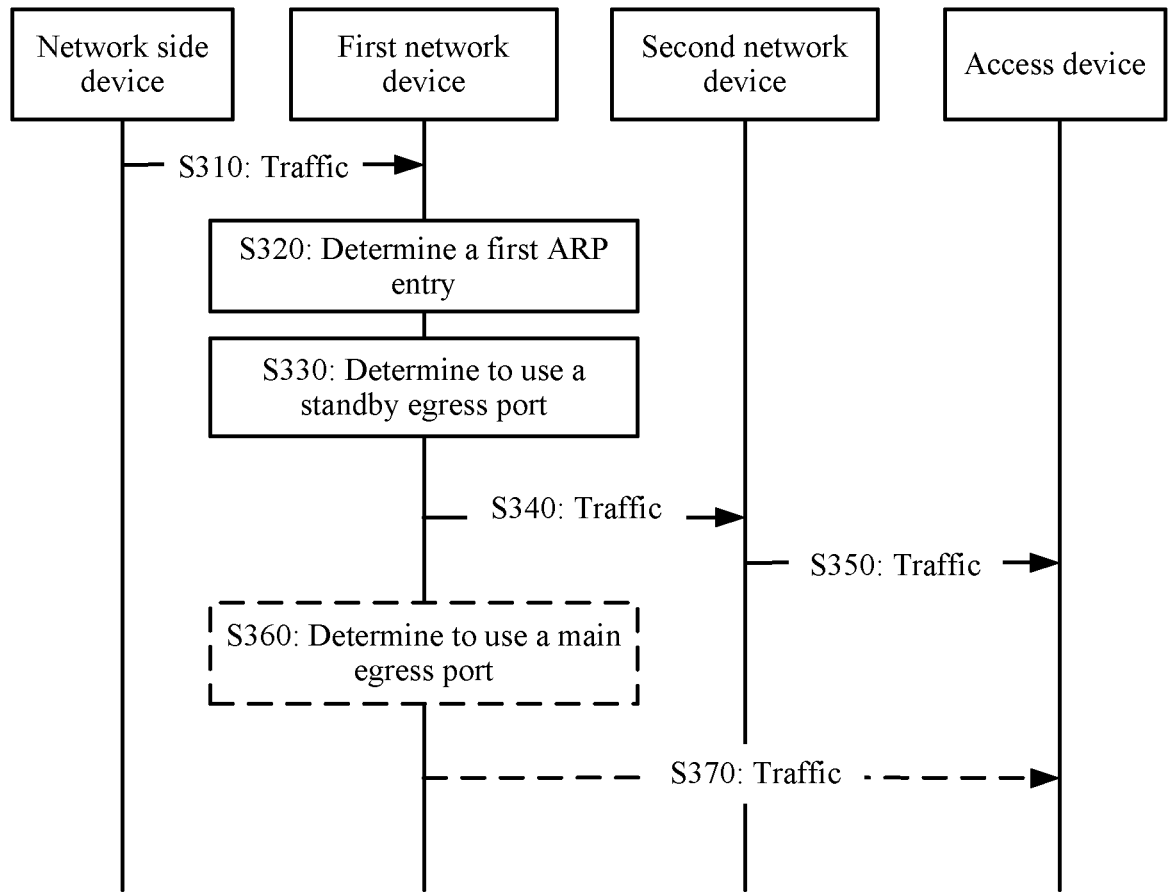
FIG. 3 is a schematic flowchart of another traffic forwarding method according to an embodiment of this application.

FIG. 3 is a schematic flowchart of another traffic forwarding method 300 according to an embodiment of this application. The method 300 may be applied to the communications system 100 shown in FIG. 1, but this embodiment of this application is not limited thereto.

S310. The network side device sends traffic to the first network device, and the traffic carries an IP address of an access device.

S320. The first network device determines a first ARP entry of the access device, where the first ARP entry is used to indicate a mapping relationship among a MAC address, an IP address, and an egress port, the egress port includes a main egress port and a standby egress port. The main egress port is an access interface of the first network device, and the standby egress port is a peer-link interface of the first network device.

S330. The first network device determines that a fault exists in an access-side link, and determines to use the standby egress port to forward the traffic.

S340. The first network device forwards the traffic to the second network device through the standby egress port (namely, a peer-link interface).

It should be understood that the ARP entries of the first network device and the second network device may be synchronized using a control plane. Specifically, after learning an ARP entry, the first network device sends the ARP entry to the second network device through the peer-link interface, and the second network device can learn the ARP entry. Therefore, in a specific implementation, once the ARP entry stored in the first network device changes, the second network device learns a new ARP entry and maintains synchronization with the first network device. For example, the first network device adds a standby egress to the second ARP entry, to obtain the first ARP entry, and the second network device synchronously learns the first ARP entry of the access device through the peer-link interface.

S350. The second network device forwards the traffic to the access device through an access interface of the second network device based on the learned ARP entry of the access device.

Optionally, after S320 is performed, the following steps may be directly performed.

S360. The first network device determines that no fault exists in an access-side link, and determines to use the main egress port to forward the traffic.

S370. The first network device directly forwards the traffic to the access device through the main egress port (namely, the access interface).

In a specific implementation, for example, if an IP address of the access device is 192.168.10.10, the second ARP entry initially learned by the first network device through the access interface may be as follows.

| IP address | MAC address | Egress port |
| --- | --- | --- |
| 192.168.10.10 | 1-1-1 | Access interface |

After the standby egress port is added, the first ARP entry obtained by the first network device is as follows.

| IP address | MAC address | Egress port |
| --- | --- | --- |
| 192.168.10.10 | 1-1-1 | Access interface (the main egress port) Peer-link interface (the standby egress port) |

It should be understood that the foregoing table is only an example for ease of understanding. Specific representation forms of the first ARP entry and the second ARP entry are not limited in this embodiment of this application.

In the traffic forwarding method in this embodiment of this application, the first network device sets the main egress port and the standby egress port for an ARP entry such that a process in which the first network device deletes the ARP entry when a fault exists in an access-side link and re-learns an ARP entry after the traffic arrives is effectively avoided, thereby helping reduce a convergence time for the traffic forwarding, and improving system performance.

It should be understood that, sequence numbers of the foregoing processes do not imply an execution sequence. The execution sequence of the processes should be determined based on functions and internal logic of the processes, and should not constitute any limitation on an implementation process of this embodiment of this application.

The traffic forwarding method according to the embodiments of this application is described above in detail with reference to FIG. 1 to FIG. 3. A traffic forwarding apparatus according to the embodiments of this application is described below in detail with reference to FIG. 4 and FIG. 5.

Figure 4:
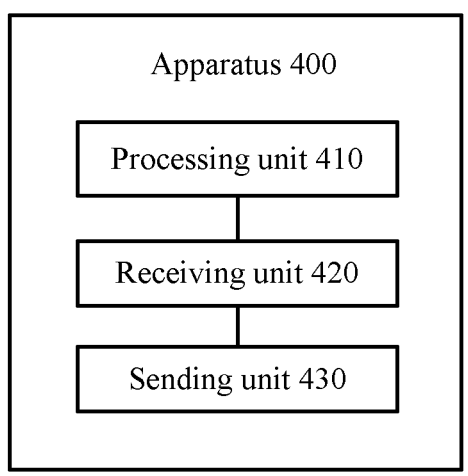
FIG. 4 is a schematic block diagram of a traffic forwarding apparatus according to an embodiment of this application.

FIG. 4 shows a traffic forwarding apparatus 400 provided in an embodiment of this application. The apparatus is applied to a network system including the apparatus, a second network device, and an access device. The access device is connected to the apparatus and the second network device through a first MC-LAG link and a second MC-LAG link in a dual-homing manner, and the apparatus and the second network device are connected to each other through the protection link. The apparatus includes a processing unit 410 configured to determine a first ARP entry of the access device, where the first ARP entry is used to indicate a mapping relationship among a MAC address, an IP address, and an egress port, the egress port includes a standby egress port, and the apparatus is connected to the protection link through the standby egress port, a receiving unit 420 configured to receive traffic sent by a network side, where the processing unit is further configured to determine whether a fault exists in the first MC-LAG link, and a sending unit 430 configured to, when a fault exists in the first MC-LAG link, send the traffic to the second network device through the protection link based on a standby egress port number in the first ARP entry, where the standby egress port number is used to indicate the standby egress port.

In the traffic forwarding apparatus in this embodiment of this application, the first network device sets the standby egress port for an ARP entry such that a process in which the first network device deletes the ARP entry when a fault exists in an access-side link and re-learns an ARP entry after the traffic arrives is effectively avoided, thereby helping reduce a convergence time for the traffic forwarding, and improving system performance.

Optionally, the egress port further includes a main egress port, the apparatus is connected to the first MC-LAG link through the main egress port, and the sending unit 430 is further configured to, when no fault exists in the first MC-LAG link, send the traffic to the access device through the first MC-LAG link based on a main egress port number in the first ARP entry, where the main egress port number is used to indicate the main egress port.

Optionally, the processing unit 410 is further configured to obtain a second ARP entry of the access device from the main egress port through learning, where the second ARP entry includes the main egress port number, determine that the main egress port is a dual-active member interface, where the dual-active member interface includes an interface for connecting to the first MC-LAG link and an interface for connecting to the second MC-LAG link, and add the standby egress port number to the egress port in the second ARP entry, to obtain the first ARP entry.

Optionally, the first ARP entry further includes a main identifier corresponding to the main egress port, the main identifier is used to indicate that the first MC-LAG link connected to the main egress port is an active link, and the main identifier is used by the apparatus to detect the first MC-LAG link.

Optionally, the first ARP entry includes a standby identifier corresponding to the standby egress port, and the standby identifier is used to indicate that the protection link connected to the standby egress port is a standby link.

It should be understood that the apparatus 400 herein is represented in a form of functional units. The term "unit" herein may be an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described functions. In an optional example, a person skilled in the art may understand that the apparatus 400 may be specifically the first network device in the foregoing embodiments, and that the apparatus 400 may be configured to perform procedures and/or steps corresponding to the first network device in the foregoing method embodiments. To avoid repetition, details are not described herein again.

Figure 5:
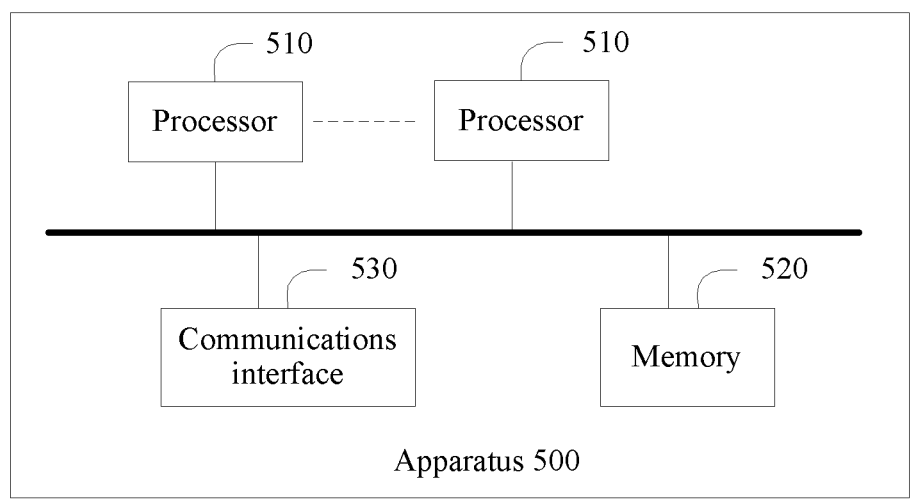
FIG. 5 is a schematic block diagram of another traffic forwarding apparatus according to an embodiment of this application.

FIG. 5 shows another traffic forwarding apparatus 500 provided in an embodiment of this application. The apparatus is applied to a network system including the apparatus, a second network device, and an access device. The access device is connected to the apparatus and the second network device through a first MC-LAG link and a second MC-LAG link in a dual-homing manner, and the apparatus and the second network device are connected to each other through the protection link. The apparatus 500 includes at least one processor 510, a memory 520, and a communications interface 530. The at least one processor 510, the memory 520, and the communications interface 530 are connected all through an internal path.

The memory 520 is configured to store a computer executable instruction.

The at least one processor 510 is configured to execute the computer executable instruction stored in the memory 520 such that the apparatus 500 can exchange data with another apparatus through the communications interface 530, to perform the traffic forwarding method provided in the foregoing method embodiments.

The at least one processor 510 is configured to perform the following operations determining a first ARP entry of the access device, where the first ARP entry is used to indicate a mapping relationship among a MAC address, an IP address, and an egress port, the egress port includes a standby egress port, and the apparatus is connected to the protection link through the standby egress port, receiving, through the communications interface, traffic sent by a network side, determining whether a fault exists in the first MC-LAG link, and when a fault exists in the first MC-LAG link, sending the traffic to the second network device through the protection link based on a standby egress port number in the first ARP entry, where the standby egress port number is used to indicate the standby egress port.

In the traffic forwarding apparatus in this embodiment of this application, the first network device sets the standby egress port for an ARP entry such that a process in which the first network device deletes the ARP entry when a fault exists in an access-side link and re-learns an ARP entry after the traffic arrives is effectively avoided, thereby reducing a convergence time for the traffic forwarding, and improving system performance.

Optionally, the egress port further includes a main egress port, the apparatus is connected to the first MC-LAG link through the main egress port, and the at least one processor 510 is further configured to, when no fault exists in the first MC-LAG link, send the traffic to the access device through the first MC-LAG link based on a main egress port number in the first ARP entry, where the main egress port number is used to indicate the main egress port.

Optionally, the at least one processor 510 is further configured to obtain a second ARP entry of the access device from the main egress port through learning, where the second ARP entry includes the main egress port number, determine that the main egress port is a dual-active member interface, where the dual-active member interface includes an interface for connecting to the first MC-LAG link and an interface for connecting to the second MC-LAG link, and add the standby egress port number to the egress port in the second ARP entry, to obtain the first ARP entry.

Optionally, the first ARP entry further includes a main identifier corresponding to the main egress port, the main identifier is used to indicate that the first MC-LAG link connected to the main egress port is an active link, and the main identifier is used by the apparatus to detect the first MC-LAG link.

Optionally, the first ARP entry includes a standby identifier corresponding to the standby egress port, and the standby identifier is used to indicate that the protection link connected to the standby egress port is a standby link.

It should be understood that the apparatus 500 may be specifically the first network device in the foregoing embodiments, and may be configured to perform the steps and/or procedures corresponding to the first network device in the foregoing method embodiments.

It should be understood that in this embodiment of this application, the processor in the foregoing apparatus includes a central processing unit (CPU), or the processor may include another general-purpose processor, a digital signal processor (DSP), an ASIC, a field programmable gate array (FPGA), or another programmable logic device, discrete gate, transistor logic device, discrete hardware component, or the like. The general-purpose processor may be a microprocessor, or the processor may be any conventional processor, or the like.

The memory may be any one or any combination of the following storage media a random access memory (RAM), a read-only memory (ROM), a non-volatile memory (NVM), a solid-state drive (SSD), a mechanical hard disk, a magnetic disk, a disk array, and the like.

The communications interface is configured for data interaction between the apparatus and another device. The communications interface may include any one or any combination of the following components with a network access function, such as a network interface (for example, an Ethernet interface) and a wireless network interface card.

Optionally, the at least one processor 510, the memory 520, and the communications interface 530 may be connected using a bus, and the bus may include an address bus, a data bus, a control bus, or the like. The bus may include any one or any combination of the following components for wired data transmission, such as an industry standard architecture (ISA) bus, a peripheral component interconnect (PCI) bus, and an extended industry standard architecture (EISA) bus.

In an implementation process, the steps in the foregoing methods may be implemented using a hardware integrated logic circuit in the processor, or using instructions in a form of software. The steps of the method disclosed with reference to the embodiments of this application may be directly performed by a hardware processor, or may be performed using a combination of hardware in the processor and a software unit. The software unit may be located in a mature storage medium in the art, such as a RAM, a flash memory, a ROM, a programmable ROM (PROM), an electrically erasable programmable ROM (EEPROM), or a register. The storage medium is located in the memory, and the processor executes the instructions in the memory and completes the steps in the foregoing methods in combination with hardware of the processor. To avoid repetition, details are not described herein again.

It should be understood that the term "and/or" in this specification describes only an association relationship for describing associated objects and represents that three relationships may exist. For example, A and/or B may represent the following three cases. Only A exists, both A and B exist, and only B exists. In addition, the character "/" in this specification usually indicates an "or" relationship between the associated objects.

A person of ordinary skill in the art may be aware that, the method steps and units described with reference to the embodiments disclosed in this specification can be implemented by electronic hardware, computer software, or a combination thereof. To clearly describe interchangeability between the hardware and the software, the foregoing has generally described the steps and compositions of each embodiment based on functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an embodiment. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments in this application.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially or all or some of the technical solutions may be implemented in a form of a software product. The software product is stored in a storage medium and includes several instructions for instructing a computer device (which may include a personal computer, a server, a network device, or the like) to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A traffic forwarding method implemented by a first network device and applied to a network, wherein the traffic forwarding method comprises:
   communicatively coupling, using a main egress port connected to a first multi-chassis link aggregation group (MC-LAG) link, the first network device to an access device;
   learning, from the main egress port, a first address resolution protocol (ARP) entry of the access device, wherein the first ARP entry indicates a mapping relationship among a media access control (MAC) address of the access device, an Internet Protocol (IP) address of the access device, and an egress port of the first network device for transmitting packets to the access device, wherein the egress port in the first ARP of the access device comprises the main egress port;
   communicatively coupling the first network device through a peer-link to a second network device;
   obtaining, through the peer-link, a device identifier of a device connected to the second network device;
   determining, based on the device identifier, whether the both the first network device and the second network device are communicatively coupled to the device through a MC-LAG dual-active member interface;
   determining that the device is the access device in response to a determination that the device is communicatively coupled to both the first network device and the second network device through the MC-LAG dual-active member interface, and adding a standby egress port to the first ARP entry of the access device, such that the egress port in the first ARP entry comprises both the main egress port and the standby egress port, and wherein the first network device is coupled to the peer-link through the standby egress port;
   synchronizing the first ARP entry of the access device with the second network device over a control plane after adding the standby egress port to the first ARP entry of the access device;
   receiving traffic from a network side;
   determining whether there is a fault associated with the first MC-LAG link; and
   sending the traffic to the second network device through the peer-link based on a standby egress port number in the first ARP entry when there is the fault associated with the first MC-LAG link, and wherein the standby egress port number indicates the standby egress port.

2. The traffic forwarding method of claim 1, further comprising sending the traffic to the access device through the first MC-LAG link based on a main egress port number corresponding to the main egress port in the first ARP entry when the first network device determines that there is no fault associated with in the first MC-LAG link.

3. The traffic forwarding method of claim 2, wherein the first ARP entry further comprises a main identifier of the main egress port, wherein the main identifier indicates that the first MC-LAG link connected to the main egress port is an active link.

4. The traffic forwarding method of claim 3, further comprising detecting the first MC-LAG link using the main identifier.

5. The traffic forwarding method of claim 1, wherein the first ARP entry comprises a standby identifier corresponding to the standby egress port, and wherein the standby identifier indicates that the peer-link connected to the standby egress port is a standby link.

6. The traffic forwarding method of claim 1, wherein the traffic carries a destination IP address that indicates the network side needs to send the traffic to an IP address of a destination device.

7. The traffic forwarding method of claim 1, wherein the first network device does not delete and relearn the first ARP entry of the access device in response to the fault associated with the first MC-LAG link.

8. A first network device applied to a network, wherein the first network device comprises:
a processor, configured to:
communicatively couple, using a main egress port of connected to a first multi-chassis link aggregation group (MC-LAG) link, the first network device to an access device;
learn, from the main egress port, a first address resolution protocol (ARP) entry of the access device, wherein the first ARP entry indicates a mapping relationship among a media access control (MAC) address of the access device, an Internet Protocol (IP) address of the access device, and an egress port of the first network device for transmitting packets to the access device, wherein the egress port in the first ARP of the access device comprises the main egress port;
communicatively couple the first network device through a peer-link to a second network device;
obtain, through the peer-link, a device identifier of a device connected to the second network device;
determine, based on the device identifier, whether both the first network device and the second network device are communicatively coupled to the device through a MC-LAG dual-active member interface;
determine that the device is the access device in response to a determination that the device is communicatively coupled to both the first network device and the second network device through the MC-LAG dual-active member interface, and add a standby egress port to the first ARP entry of the access device, such that the egress port in the first ARP entry comprises both the main egress port and the standby egress port, and wherein the first network device is coupled to the peer-link through the standby egress port;
synchronize the first ARP entry of the access device with the second network device over a control plane after adding the standby egress port to the first ARP entry of the access device; and
determine whether there is a fault associated with the first MC-LAG link;
a receiver coupled to the processor and configured to receive traffic from a network side; and
a transmitter coupled to the processor and configured to send the traffic to the second network device through the peer-link based on a standby egress port number in the first ARP entry when there is the fault associated with the first MC-LAG link, and wherein the standby egress port number indicates the standby egress port.

9. The first network device of claim 8, wherein the transmitter is further configured to send the traffic to the access device through the first MC-LAG link based on a main egress port number corresponding to the main egress port in the first ARP entry when there is no fault associated with the first MC-LAG link.

10. The first network device of claim 9, wherein the first ARP entry further comprises a main identifier of the main egress port, wherein the main identifier indicates that the first MC-LAG link connected to the main egress port is an active link.

11. The first network device of claim 8, wherein the first ARP entry comprises a standby identifier corresponding to the standby egress port, and wherein the standby identifier indicates that the peer-link connected to the standby egress port is a standby link.

12. The first network device of claim 8, wherein the traffic carries a destination IP address that indicates the network side needs to send the traffic to an IP address of a destination device.

13. A computer program product comprising a non-transitory computer-readable medium storing computer-executable instructions that, when executed by a processor, cause a first network device in a network to:
communicatively couple, using a main egress port of connected to a first multi-chassis link aggregation group (MC-LAG) link, the first network device to an access device;
learn, from the main egress port, a first address resolution protocol (ARP) entry of the access device, wherein the first ARP entry indicates a mapping relationship among a media access control (MAC) address of the access device, an Internet Protocol (IP) address of the access device, and an egress port of the first network device for transmitting packets to the access device, wherein the egress port in the first ARP of the access device comprises the main egress port;
communicatively couple the first network device through a peer-link to a second network device;
obtain, through the peer-link, a device identifier of a device connected to the second network device;
determine, based on the device identifier, whether both the first network device and the second network device are communicatively coupled to the device through a MC-LAG dual-active member interface;
determine that the device is the access device in response to a determination that the device is communicatively coupled to both the first network device and the second network device through the MC-LAG dual-active member interface, and add a standby egress port to the first ARP entry of the access device, such that the egress port comprises both the main egress port and the standby egress port, and wherein the first network device is coupled to the peer-link through the standby egress port;
synchronize the first ARP entry of the access device with the second network device over a control plane after adding the standby egress port to the first ARP entry of the access device;
receive traffic from a network side;
determine whether there is a fault associated with the first MC-LAG link; and
send the traffic to the second network device through the peer-link based on a standby egress port number in the first ARP entry when there is the fault associated with the first MC-LAG link, and wherein the standby egress port number indicates the standby egress port.

14. The computer program product of claim 13, wherein the computer-executable instructions further cause the first network device to be configured to send the traffic to the access device through the first MC-LAG link based on a main egress port number corresponding to the main egress port in the first ARP entry when there is no fault associated with the first MC-LAG link.

15. The computer program product of claim 14, wherein the first ARP entry further comprises a main identifier of the main egress port, wherein the main identifier indicates that the first MC-LAG link connected to the main egress port is an active link.

16. The computer program product of claim 13, wherein the first ARP entry comprises a standby identifier corresponding to the standby egress port, and wherein the standby identifier indicates that the peer-link connected to the standby egress port is a standby link.

17. The computer program product of claim 13, wherein the computer-executable instructions further cause the first network device to be configured to receive the traffic that carries a destination IP address to indicate that the network side needs to send the traffic to an IP address of a destination device.

18. The computer program product of claim 15, wherein the computer-executable instructions further cause the first network device to be configured to detect the first MC-LAG link using the main identifier.

19. The computer program product of claim 13, wherein the computer-executable instructions further cause the first network device to be configured to not delete and relearn the first ARP entry of the access device in response to the fault associated with the first MC-LAG link.

\* \* \* \* \*